United States Patent
Hahn et al.

(10) Patent No.: US 6,991,189 B2
(45) Date of Patent: Jan. 31, 2006

(54) PROCESS FOR MICRONIZING MATERIALS

(75) Inventors: William E. Hahn, Aurora, CO (US); Charles A. Arnold, Englewood, CO (US)

(73) Assignee: Pulsewave LLC, Centennial, CO (US)

( * ) Notice: Subject to any disclaimer, the term of this patent is extended or adjusted under 35 U.S.C. 154(b) by 11 days.

(21) Appl. No.: 10/793,716

(22) Filed: Mar. 5, 2004

(65) Prior Publication Data
US 2004/0169096 A1 Sep. 2, 2004

Related U.S. Application Data

(60) Division of application No. 09/945,570, filed on Aug. 31, 2001, now Pat. No. 6,726,133, which is a continuation-in-part of application No. 09/694,708, filed on Oct. 23, 2000, now abandoned, which is a continuation of application No. 09/290,483, filed on Apr. 12, 1999, now Pat. No. 6,135,370, which is a division of application No. 08/897,015, filed on Jul. 18, 1997, now abandoned.

(51) Int. Cl.
B02C 19/12 (2006.01)

(52) U.S. Cl. ............................................ 241/1; 241/25
(58) Field of Classification Search .................... 241/1, 241/25, 301
See application file for complete search history.

(56) References Cited

U.S. PATENT DOCUMENTS

| | | |
|---|---|---|
| 134,513 A | 1/1873 | Ghichester |
| 248,923 A | 11/1881 | DeChamp |
| 1,212,418 A | 1/1917 | Sturtevant |
| 1,212,419 A | 1/1917 | Sturtevant |
| 1,636,033 A | 7/1927 | Agnew |
| 1,656,756 A | 1/1928 | Payne |
| 1,758,101 A | 5/1930 | Bates |
| 1,798,465 A | 3/1931 | Grindle |
| 1,911,193 A | 5/1933 | Hill |
| 2,562,560 A | 7/1951 | Macartney |
| 2,709,552 A | 5/1955 | Lecher |
| 2,847,168 A | 8/1958 | Smiley |
| 2,940,676 A | 6/1960 | Brake |
| 3,065,919 A | 11/1962 | Burkett et al. |
| 3,160,354 A | 12/1964 | Burkett |
| 3,207,447 A | 9/1965 | Whitman |
| 3,545,683 A | 12/1970 | Schulte |
| 3,556,414 A | 1/1971 | Eberly, Jr. |

(Continued)

FOREIGN PATENT DOCUMENTS

DE 2433657 3/1975

OTHER PUBLICATIONS

U. Houston Mech. Eng. Dept., "Rotating Single and Multi-Phase Flows-The Basis For Votex Technology", http://www.ifdt.uh.edu/vct/rotate-html, Jun. 11, 1997

(Continued)

Primary Examiner—Mark Rosenbaum
(74) Attorney, Agent, or Firm—Kenneth E. Darnell

(57) ABSTRACT

The invention provides methods of disintegrating or reducing the particle size of elemental materials, such as various forms of carbon, and organic crystals that contain minerals and that do not contain minerals. The method include the steps of entraining the material in a gas flow through an inlet of a housing, subjecting the flowing material to a plurality of alternating pressure increases and decreases within the housing, disintegrating the flowing material with the pressure increases and decreases, thereby reducing the mean particle size of the material, and discharging the disintegrated material though an outlet of the housing.

15 Claims, 11 Drawing Sheets

U.S. PATENT DOCUMENTS

| | | |
|---|---|---|
| 3,987,970 A | 10/1976 | Burkett |
| 4,144,167 A | 3/1979 | Burkett |
| 4,151,794 A | 5/1979 | Burkett |
| 4,156,593 A | 5/1979 | Tarpley |
| 4,313,737 A | 2/1982 | Massey et al. |
| 4,556,467 A | 12/1985 | Kuhn et al. |
| 4,690,338 A | 9/1987 | Sayler et al. |
| 4,888,216 A | 12/1989 | Sannohe |
| 4,989,796 A | 2/1991 | Eide |
| 5,067,661 A | 11/1991 | Eide |
| 5,192,029 A | 3/1993 | Harris |
| 5,577,669 A | 11/1996 | Vujnovic |
| 5,840,179 A | 11/1998 | Minkara et al. |

OTHER PUBLICATIONS

Reba Imants, "Applications of Coanda Effect", Scientific American, Jun. 1966.

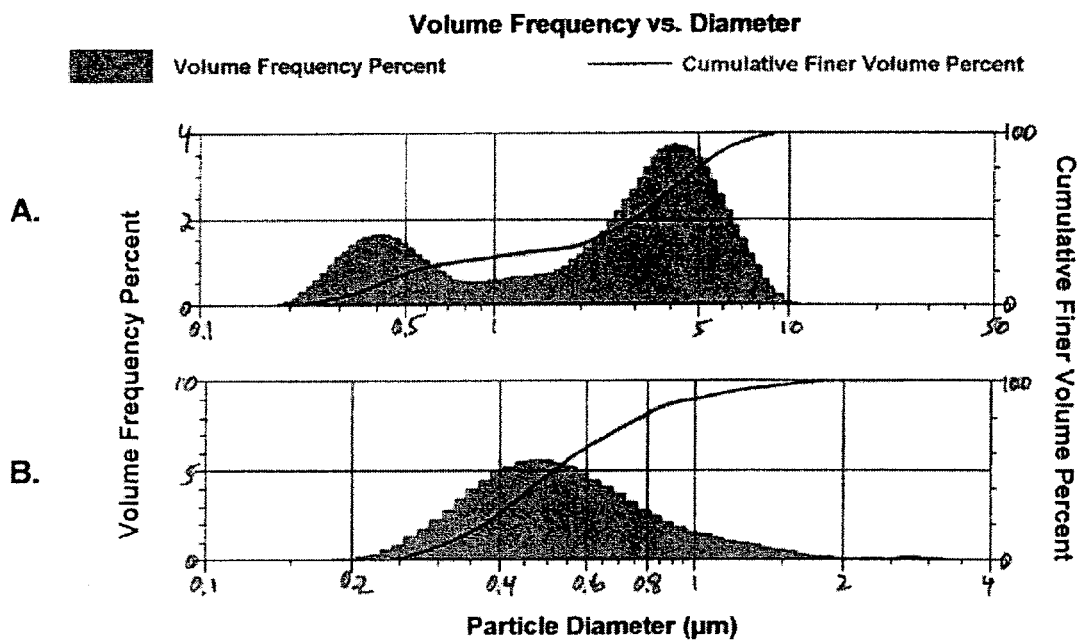
Figure 14 Resonance Disintegration (RD) of Standard Reference Carbon Black N660 Dispersed in Water. A. Before RD, B. After RD.
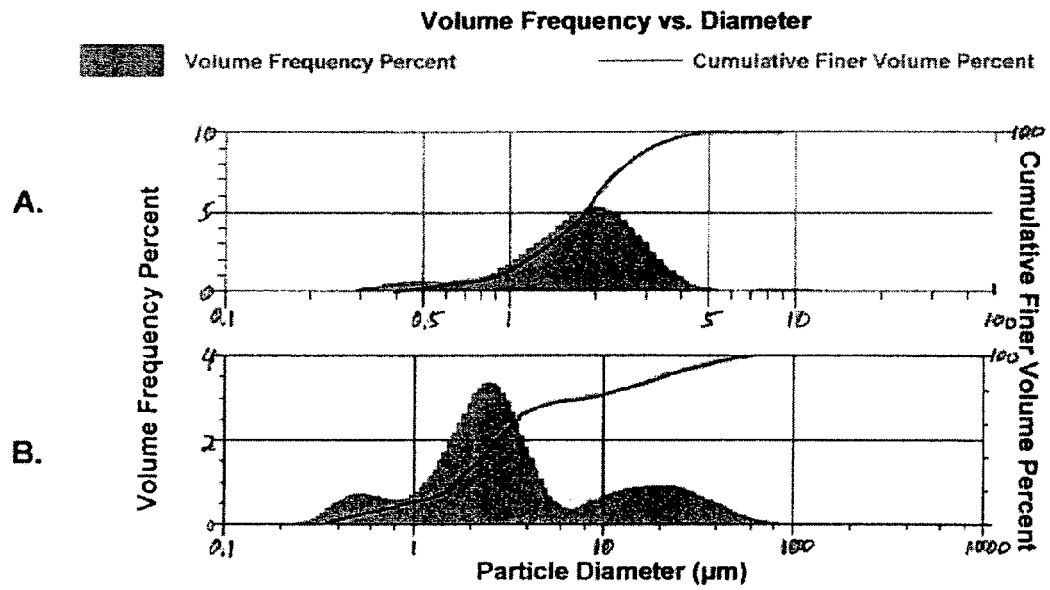
Figure 15 Resonance Disintegration (RD) of Standard Reference Carbon Black N660 Dispersed in Isopropanol. A. Before RD, B. After RD.

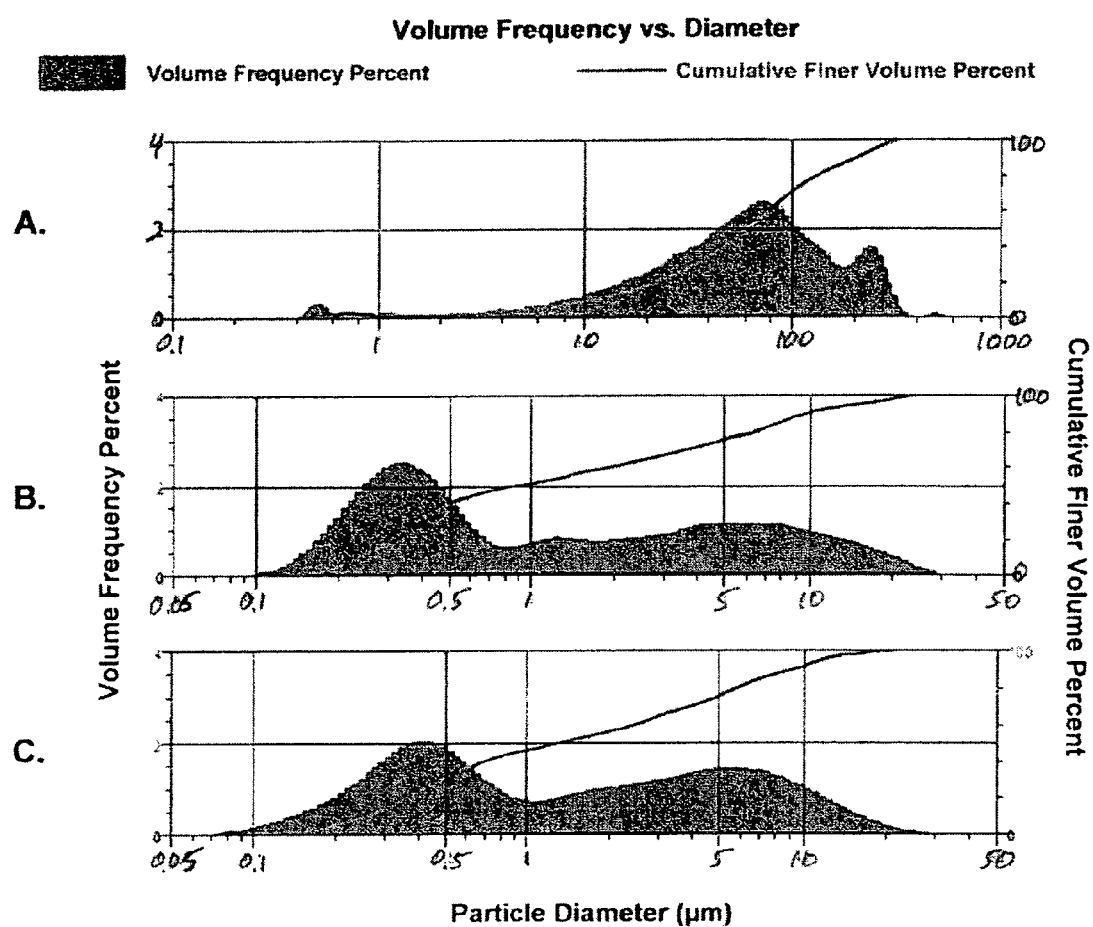
Figure 16 Resonance Disintegration (RD) of Pyrolytic Char Dispersed in Water. A. Before RD, B. After RD Once, C. After RD Twice.

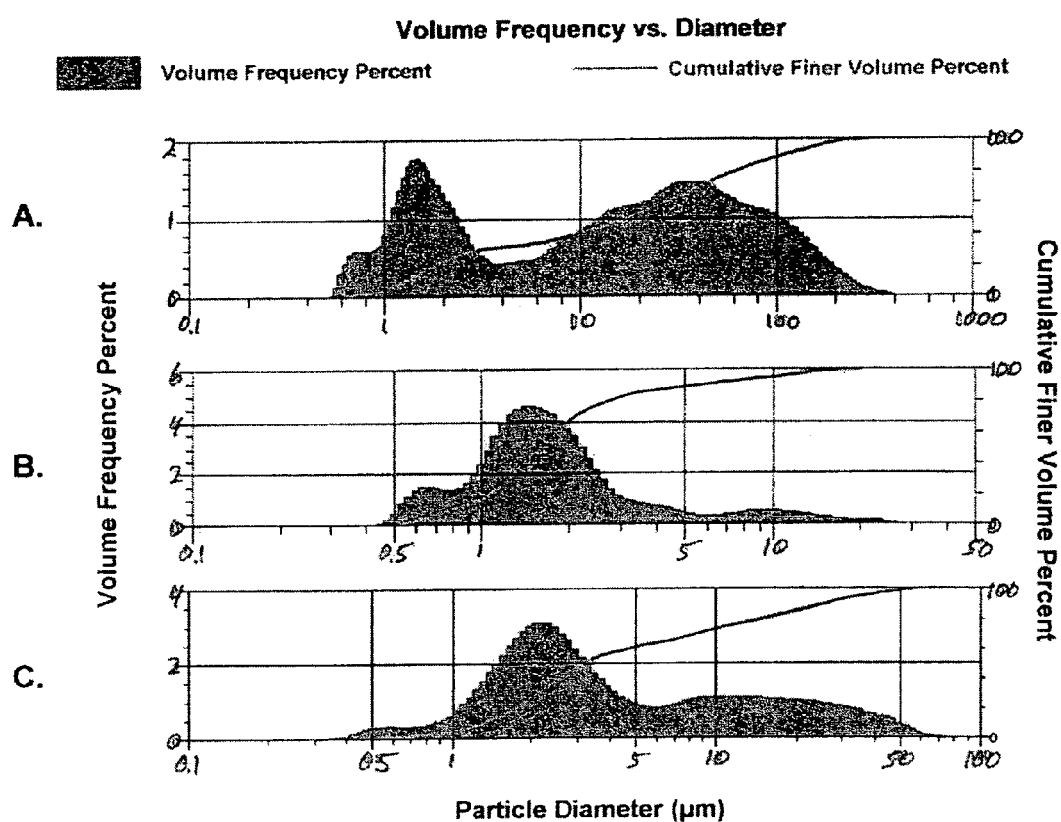
Figure 17  Resonance Disintegration (RD) of Pyrolytic Char Dispersed in Isopropanol.  A. Before RD,  B. After RD Once,  C. After RD

PROCESS FOR MICRONIZING MATERIALS

This patent application is a divisional application of U.S. patent application Ser. No. 09/945,570, filed Aug. 31, 2001 now U.S. Pat. No. 6,726,133, which is a continuation-in-part of U.S. patent application Ser. No. 09/694,708, filed Oct. 23, 2000, and now abandoned, which is a continuation of U.S. patent application Ser. No. 09/290,483, filed Apr. 12, 1999 and issued as U.S. Pat. No. 6,135,370, which is a divisional application of U.S. patent application Ser. No. 08/897,015, filed Jul. 18, 1997, and now abandoned, the entire disclosures of which are hereby expressly incorporated herein by reference.

FIELD OF THE INVENTION

The present invention relates generally to methods for producing ultra-fine particles of amorphous elemental and compound materials in amorphous or crystalline form.

BACKGROUND OF THE INVENTION

Small particle size material has a large surface to volume ratio. For this reason, chemical processes often work better by using small size particles for feed stock material. Small particle size is also important for pharmaceuticals and nutritional supplements, which are taken up by the body more easily and effectively when in small particle sizes.

One such material with many industrial uses is carbon black, which is an amorphous form of pure carbon. Carbon black is useful as a carbon feed stock for chemical processes, e.g. in plastic production, in compounding of rubber, and in the production of inks and pigments. Typically, carbon black is produced by burning acetylene and other organic fuels under low oxygen conditions. This is energy intensive and creates gas by-products that are undesirable.

There is a growing interest in recovery of carbon from scrap material so it can be recycled in useful ways. One such source of carbon is from pyrolyzed scrap vehicle tires. Millions of kilograms of char (essentially pure carbon) are potentially available from tire "waste." Chars having different properties and characteristics can be made consistently by changing process parameters, such as pyrolysis temperature, heating rate, pyrolysis time, the rotating speed of the reactor, and the presence or absence of additives.

Such pyrolytic char particles typically range in size from about one micron to over one millimeter. Carbon particles of this size range are too large for use in compounding of tire tread rubber, plastics and other materials or for use as pigment in printers. The char must therefore be made into particle sizes of about one micron or less in order to generate carbon that can be used to produce new products. For most large volume uses, such fine particle sizes are desirable or required. Since thousands of tons of fine carbon particles are used in various industries, machines that can process large amounts of material are required.

Other hard materials that are crystalline or amorphous in form are generally difficult to grind into smaller particle sizes that would be useful for uses such as food processing or nutritional supplements. Such materials include crystals of organic molecules containing minerals and non-mineral containing organic compounds. For most of these materials a particle size of less than about 50 microns is highly desirable.

BRIEF SUMMARY OF THE INVENTION

The invention provides methods for producing useful, small particle forms of both elemental and compounded materials using resonance disintegration. The materials may be in either amorphous or crystalline form. In most cases, a fine, flowable powder is produced.

In one aspect, the invention provides a continuous flow method of reducing the mean particle size of a particulate carbon material that consists of at least about 90% carbon by weight. The method includes entraining the carbon material in a gas flow through an inlet of a housing, subjecting the flowing carbon material to a plurality of rapid alternating pressure increases and decreases within the housing, disintegrating the flowing carbon material with the pressure increases and decreases, thereby reducing the mean particle size of the carbon material, and discharging the disintegrated carbon material though an outlet of the housing. The carbon material can comprise an amorphous form of carbon, such as carbon black or pyrolyzed carbon char, or a crystallized form of carbon, such as graphite. Processing as recited above appears to produce a more hydrophilic form of carbon particle. In one embodiment, the method can include coating the carbon particles with an adherent material, such as oil, while the particles are flowing though the housing.

In embodiments where the amorphous form of carbon is carbon char, the median volume distribution of the sizes of the discharged carbon particles is in a range of about 1.6–2.7 microns when dispersed in isopropanol. Such discharged carbon particles when dispersed in isopropanol are characterized by at least about 93% of the particles being below about 30 microns in size, by about 60–90% of the particles being below about 5 microns in size, and by about 5.3–16% of the particles being below about 1 micron in size. When dispersed in water, the median volume distribution of the sizes of the discharged carbon particles made from carbon char is less than about one micron, and preferably about 0.52–0.88 microns or less. When dispersed in water, the discharged carbon particles made from char are characterized by essentially 100% of the particles being below about 30 microns in size, by about 75% of the particles being smaller that about 5 microns in size, and by about 46–51% of the particles by volume being below about 1 micron in size.

When the elemental amorphous material is carbon black, the median volume distribution of the sizes of the discharged carbon particles is less than about 3 microns, and preferably from about 0.52–2.7 microns in size. The median volume distribution of the discharged carbon particles made from carbon black is about 0.52 microns when dispersed in water. The discharged carbon particles when dispersed in water are characterized by essentially 100% of the particles being about 5 microns or less, and by about 90% of the particles being about 1 micron or less.

The invention, in yet another aspect, provides a powdered form of amorphous carbon, consisting essentially of particles that when dispersed in water are characterized by essentially 100% of the particles having a size of about 5 microns or less, and by about 90% of the volume of the particles having a size of about 1 micron or less. The particles can be further characterized by having a median volume distribution of about 0.52 microns.

In still another aspect, the invention provides a powdered form of carbon char, consisting essentially of particles that when dispersed in water are characterized by essentially 100% of the particles being about 30 microns or less. The powdered carbon char particles can be further characterized by about 75% of the particles by volume being about 5 microns or less in size, and by at least about 46% of the particles by volume being about one microns or less in size In another aspect, the invention provides a continuous flow method of reducing the particle size of crystals of an organic molecule, wherein the initial particle size of the crystals is at least about +80 mesh. The method steps include: entraining the crystals in a gas flow through an inlet into a housing; subjecting the crystals to a plurality of pressure increases and decreases while flowing through the housing; disintegrating the flowing crystals with the pressure increases and decreases, thereby reducing the mean particle size of the crystals; and discharging the disintegrated crystals though an outlet of the housing, wherein substantially all the discharged crystals have a particle size that is about –270 mesh. In some embodiments, wherein substantially all of the discharged crystals have a particle size that is less than about 20 microns. In other embodiments, most of the discharged crystals have a particle size that is less than about 4 microns.

The organic molecule can contain a mineral. In certain features, the organic molecule is selected from the group consisting of calcium citrate, magnesium citrate and methylsulfonylmethane.

In other embodiments wherein the organic molecule does not contain a mineral. Such organic molecule may be selected from the group consisting of creatine monohydrate, ipriflavone, and zein.

The invention provides many advantages. The ultrafine carbon particles produced according to the invention have a very small size distribution, even smaller than carbon black, when dispersed in water. The small particle size and the easy dispersion in water makes these carbon particles particularly useful for making inks and dyes for use in ink jet and other types of printers. The fine particle size carbon material is also very useful as a feed-stock for compounding tread rubber, plastics, and the like.

The organic materials that are reduced in size are more easily put into solution than other forms of such compounds. This is advantageous when using these substances in food processing or as dietary food supplements. The smaller particle size enables these materials to be more readily absorbed in the body.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 14A and 14B are graphs of the volume frequency vs. diameter for standard reference carbon black N660 dispersed in water before resonance disintegration and after resonance disintegration, respectively;

FIGS. 15A and 15B are graphs of the volume frequency vs. diameter for the carbon black samples dispersed in isopropanol before resonance disintegration and after resonance disintegration, respectively;

FIGS. 16A 16B, and 16C are graphs of the volume frequency vs. diameter for pyrolytic carbon char dispersed in water before resonance disintegration, after resonance disintegration once, and after resonance disintegration twice, respectively; and FIGS. 17A, 17B and 17C are graphs of the volume frequency vs. diameter for the pyrolytic carbon char samples dispersed in isopropanol before resonance disintegration, after resonance disintegration once, and after resonance disintegration twice, respectively.

Figure 1:
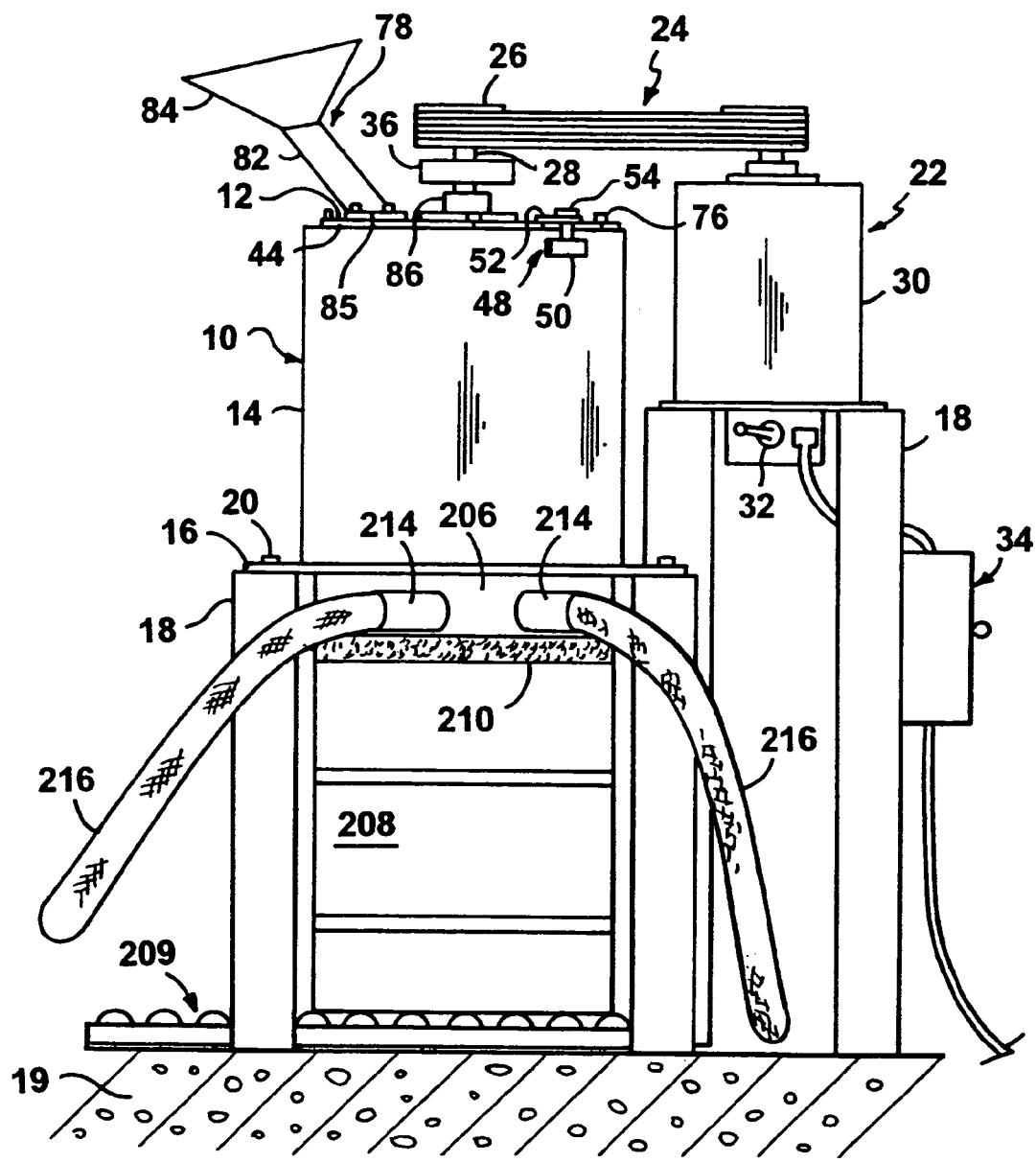
FIG. 1 is an elevation view of a resonance disintegration system according to the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides methods of producing ultrafine particles from organic and inorganic compounds that are in crystalline or amorphous states. In addition the invention provides methods of producing ultrafine particles of elemental nonmalleable materials in crystalline or amorphous states. In this specification the term "micronized" means particle sizes of less than about 50 microns (about –270 mesh). The materials are reduced in size by resonant disintegration (RD). RD produces powerful shock waves that applies destructive resonance to particles as they pass through a RD mill, which is described below. The shock waves are generated by turning rotors within a multi-sided chamber. The rotors, which alternate with a series of orifice plates, cause material flowing with gas through the chamber to suffer rapidly alternating compressive and decompressive forces as they are driven through the RD mill by the spinning rotors. The RD mill provides thousands of pulse waves and incremental increases in the magnitude of the shock waves as the flowing material passes through subsequent levels of rotors and orifice plates. Material being processed by the RD mill is also exposed to considerable shear forces and piezoelectric forces. Resonance forces are augmented by vortex-generated shearing forces that are phased for delivery just at the time particles approach and exceed their inherent limit of elasticity. Design features provide for phasing of forces such that energy transfer to the machine itself is greatly minimized, thus enhancing the efficiency and smoothness of operation. It is believed that material being processed by the RD mill are also subject to substantial pulsed piezoelectric forces.

Using the forces described above it is clear that the RD mill reduces particle size by fragmenting resonance forces that vibrate and tear particles apart. This is in contrast with the crushing forces generated in hammer, ball and jet mills. RD cleaves particles apart along various boundaries. For example, crystalline materials are broken along planes of the crystalline lattice structure that are weakest, or most susceptible to separation at a given resonance frequency. Once the elastic limit of a given material is exceeded, the particle is disintegrated into smaller particles. Hard, crystalline materials with little elasticity are therefore readily micronized, whereas highly elastic materials, such as certain types of rubbers and plastics, are more resistant to fragmentation into fine particle size, but can still be significantly reduced in size.

The medium used to conduct RD is commonly atmospheric air. Other gases, such as nitrogen and carbon dioxide, as well as water/gas mixtures can be accommodated. Whatever the media, material flows through the RD mill in less than a second and, depending upon the material, 200–3500 kg can be processed per hour. Owing to the RD mill design, the material is entrained with gas flowing along the surfaces and edges of the rotors and orifice plates such that contact with the internal parts of the RD mill and energy transfer to the machine is minimized. This important feature is called a Coanda flow. In fact, most of the material at any one instant is not in physical contact with the machine. This markedly reduces the transfer of metal from the RD mill to the product, as is possible with traditional impact milling equipment.

The operational speed and direction of rotation of the rotors can be varied over a continuous range, typically between about 1000–5000 rpm. This provides a mechanism for fine-tuning the RD milling process for different materials, as different rotation speeds generate different frequencies and amplitudes of compression and decompression.

In one example, the invention provides ultrafine particles of carbon having an average primary particle size of about 38 nanometers (nm) in aggregates and agglomerates ranging in size from about 1 m to 10 m. Over 70% of the carbon particulate volume is below 1 m when dispersed in water. In other examples, the invention provides micronized crystals of organic molecules containing minerals, such as magnesium citrate, calcium citrate, and methylsulfonylmethane, and micronized non-mineral containing organic compounds, such as creatine monohydrate and ipriflavone (7-isopropoxy-isoflavone).

In the following sections, an RD mill will be described first. Methods of using the RD mill to make ultrafine particles of carbon and other materials will be described next, with descriptions of the materials produced and their uses.

Resonance Disintegration Mill

Figure 2:
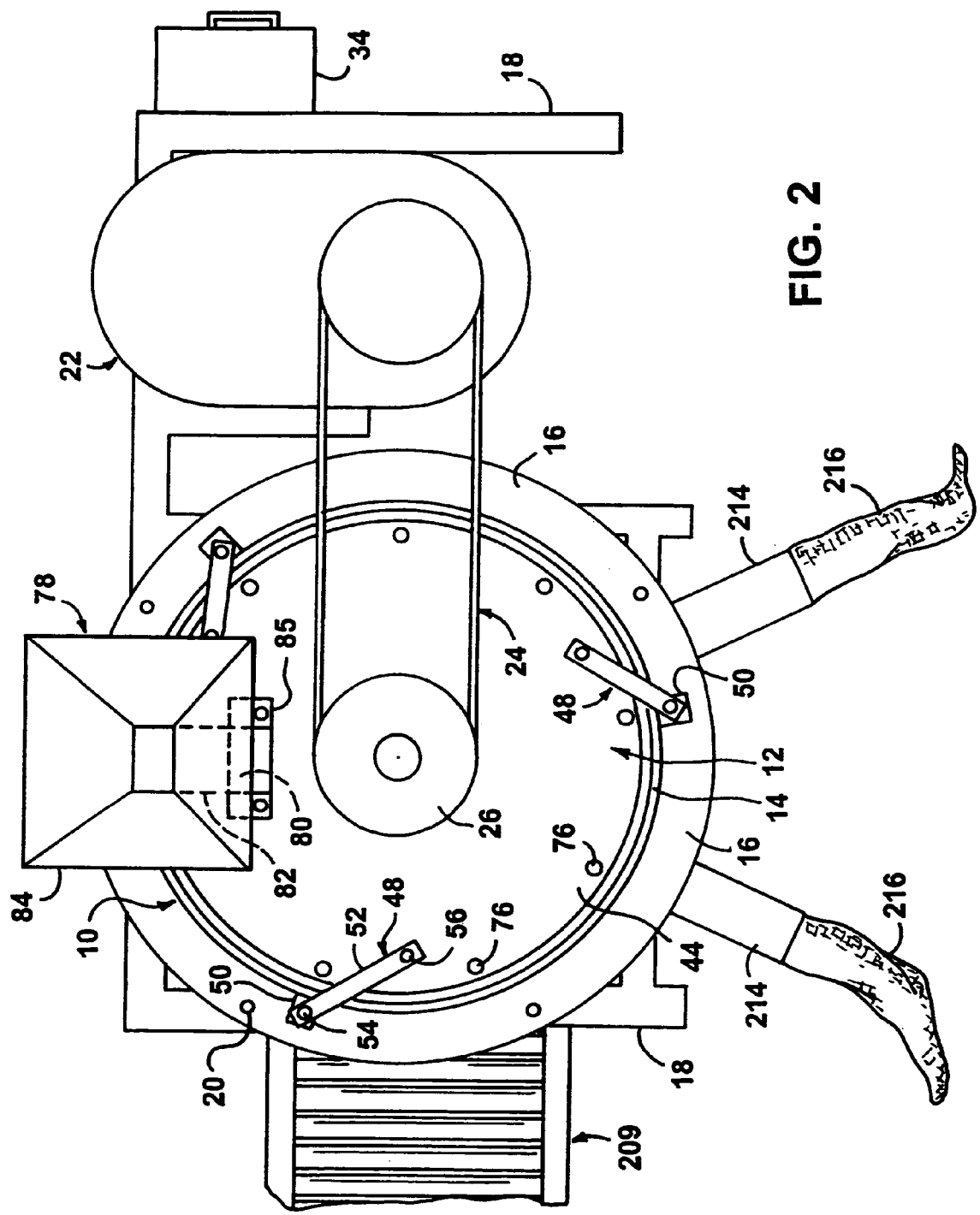
FIG. 2 is a top plan view of the resonance disintegration system illustrated in FIG. 1.

An RD mill is described in U.S. Pat. No. 6,227,473, the entire disclosure of which is included herein by reference. Referring now to FIGS. 1 and 2, a RD mill 10 includes a housing 12 containing a rotor assembly 38, which will be described in detail below. Housing 12 is surrounded by a cylindrical shield 14 that is supported from an annular plate 16 by a free-standing support frame 18 on a concrete slab 19. Annular plate 16 is welded to shield 14 and secured to frame 18 with bolts 20.

Frame 18 also supports a motor assembly 22, which provides rotational power to the rotor assembly via a single four-grooved belt 24 coupling to a variable mechanical sheave 26. Sheave 26 is connected to a rotor shaft 28 that extends through housing 12. Rotor shaft 28 is fabricated from 2 inch (5.1 cm) diameter, 4140 steel rod. Motor assembly 22 includes a 100_hp, 480 V, three-phase motor 30 that has a variable frequency drive control 32. Motor assembly 22 receives power from a fusible disconnect 34. The variable frequency drive and control 32 permits the speed of rotor shaft 28 to be continuously varied between about 600–5000 revolutions per minute (rpm). A sprocket assembly 36 attached to shaft 28 is used to measure the actual rotational speed of shaft 28. A shroud (not shown) can be used to cover belt assembly 24. Alternatively, motor 30 can be configured for direct, variable-speed drive.

Figure 3:
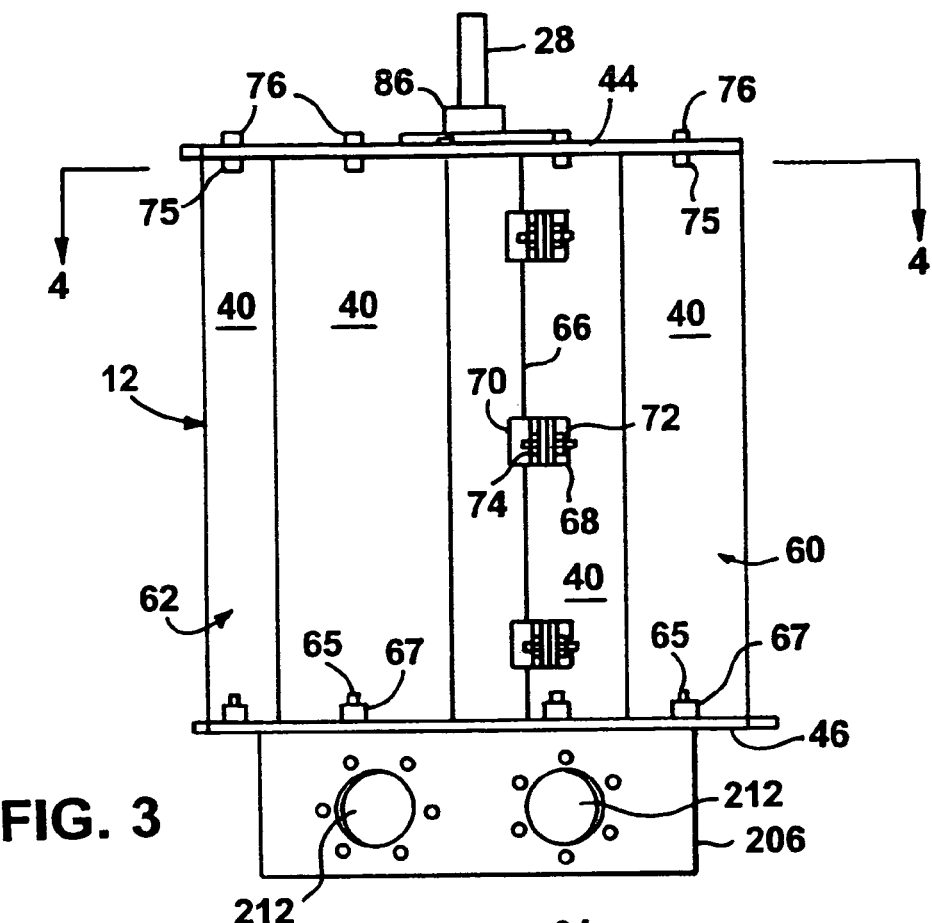
FIG. 3 is an elevation view of a rotor assembly housing of the resonance disintegration system illustrated in FIG. 1.
Figure 4:
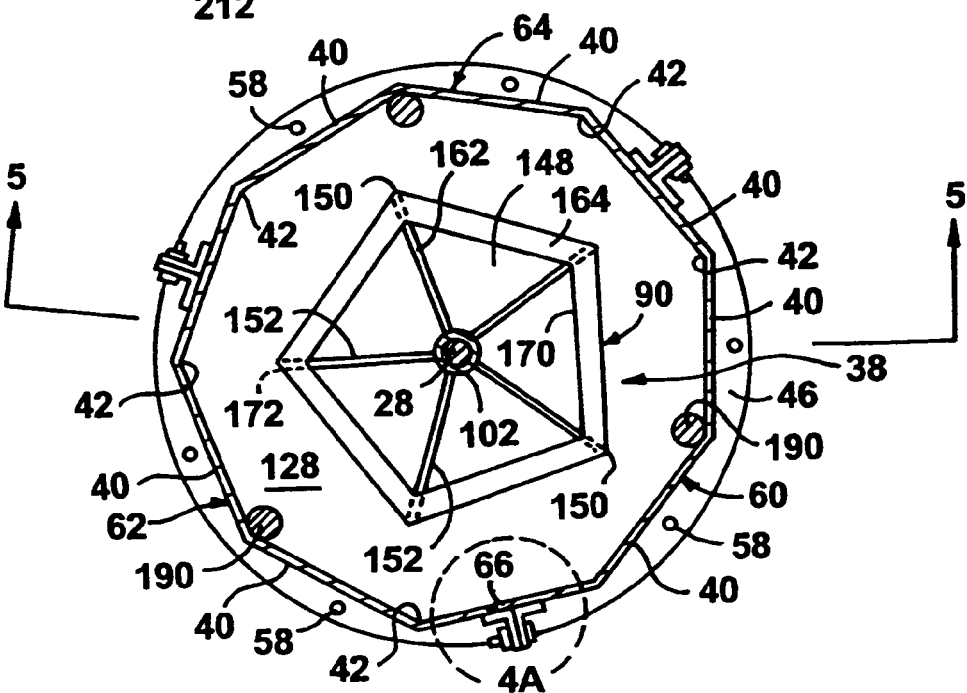
FIG. 4 is a cross sectional view through line 4—4 of FIG. 3, and in which a distributor rotor is shown in plan view.

Referring now also to FIGS. 3 and 4, housing 12 has nine longitudinally extending side walls 40 forming a regular polygon shape in latitudinal cross section. The interior surface of housing 12 has an inscribed diameter of approximately 23.5 inches (59.7 cm). Sides 40 form 40° apices, or interior corners 42, where they meet. Sides 40 and interior corners 42 extend longitudinally between a top plate 44 and a bottom plate 46. Top and bottom plates 44, 46 are approximately 30.5 inches (77.5 cm) apart. Top plate 44 is rigidly tied to shield 14 with three strap assemblies 48 (FIGS. 1 and 2). Strap assemblies 48 each include a bracket 50 welded to the outer surface of shield 14, a rigid strap 52, and bolts 54, 56 connecting strap 52 to bracket 50 and top plate 44, respectively.

Figure 4A:
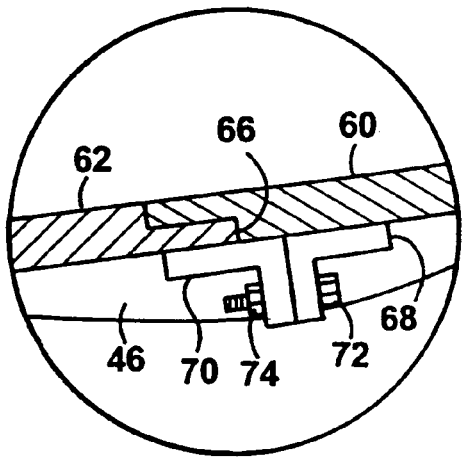
FIG. 4A is a detail of FIG. 4.

Sides 40 are formed of three panels 60, 62, 64, each including two full sides 40 and two partial sides 40, and three interior corners 42. Referring now also to FIG. 4A, each pair of panels, e.g., 60 and 62, can be joined with an overlapping seam 66 located about midway between corners 42. Brackets 68 are welded to panel 60, and brackets 70 are welded to panel 62 adjacent to seam 66. Bracket pairs 68, 70 are tied together by fasteners, for example, with bolts 72 and nuts 74. A sealing joint material, such as, for example, a silicon based sealant, can be used at seam 66 and other joints between pieces of housing 12 to make housing approximately air-tight.

Referring again to FIGS. 2 and 3, bottom plate 46 is supported from a portion of annular plate 16 that extends radially inward a short distance from shield 14. A gasket (not shown) providing a liquid seal is placed between annular plate 16 and bottom plate 46. An I-bolt arrangement (not shown) can be employed for ensuring a positive seal with the gasket. Bottom plate 46 is secured to panels 60, 62, 64 with nine threaded fasteners 65 that extend through apertures formed in respective fittings 67 attached to panels 60, 62, 64, and that screw into threaded holes 58 arrayed around the periphery of bottom plate 46. Top plate 44 is bolted to threaded fittings 75 on panels 60, 62, 64 with threaded fasteners 76.

A feed chute 78 for introducing material to be micronized into housing 12 extends through an aperture 80 in top plate 44. For clarity of illustration, feed chute 78 is illustrated at a position in FIG. 2 that is different from the position depicted in FIG. 1. Feed chute 78 includes a rectangular shaped tube 82 that is oriented relative to the plane of top plate 44 at an angle of approximately 44 degrees. Feed chute 78 also has a funnel 84 at its top end and a bracket 86 for attachment to top plate 44. Tube 82 is approximately 13.25 inches long, extends approximately 1.375 (3.5 cm) inches below the bottom side of top plate 44, and has interior dimensions of 3×4 inches (7.6×10.2 cm). Tube 82 includes a flange 85 for attaching feed chute 78 to top plate 44, e.g., with threaded fasteners.

The rotor assembly 38 will now be described in detail with reference to FIGS. 1 and 4–6 Rotor assembly 38 includes a rotatable shaft 28 that extends longitudinally through housing 12. Shaft 28 extends through a top bearing assembly 86 that is bolted to top plate 44. Sprocket speed indicator assembly 36 and sheave 26 are positioned on shaft 28 above top bearing assembly 86. A bottom bearing assembly 88 is bolted to the bottom side of bottom plate 46. Shaft does not extend through bottom bearing assembly 88.

Within housing 12, there are six longitudinally spaced rotors 90, 92, 94, 96, 98, 100, each being fixed to a respective hub 102, 104, 106, 108, 110, 112 that is coupled to shaft 28 by two keys (not shown). Spacers 114, 116, 118, 120, 122, which are also keyed onto shaft 28, are positioned between adjacent pairs of hubs 102, 104, 106, 108, 110, 112. Spacers 124 and 126 are positioned adjacent top plate 44 and bottom plate 46, respectively. Spacer 124 is also secured to shaft 28 with a set screw (not shown). Shaft 28 can be fabricated is made of 2 inch diameter 4140 alloy steel. The diameter of each spacer is approximately 3.5 inches (8.9 cm). The longitudinal position of one or more than one of rotors 90, 92, 94, 96, 98, 100 can be adjusted by changing the length one or more of spacers 114, 116, 118, 120, 122, 126.

Orifice plates 128, 130, 132, 134 and 136 are positioned between adjacent pairs of rotors 90, 92, 94, 96, 98 and 100. Each of orifice plates 128, 130, 132, 134, 136 includes a central aperture, which, with its respective spacer 114, 116, 118, 120, 122, provides an annular shaped orifice 138, 140, 142, 144, 146 therebetween. Orifice plates 128, 130, 132, 134, 136 each extend to sides 40 of housing 12 such that there is no gap between the edge of an orifice plate and the housing sides 40. A gasket or other sealing means can be used to assure that there is no space through which a gas or liquid can flow between the orifice plates and the housing.

In the described embodiment, each of shield 14, annular plate 16, top plate 44, bottom plate 46, panels 60, 62, 64, rotors 90, 92, 94, 96, 98, 100, and orifice plates 128, 130, 132, 134, 136 are fabricated of 0.5 inch (1.27 cm) thick low-carbon steel, such as, for example, 1020 steel. These components may be fabricated from different materials, including harder materials and softer materials, depending upon the intended application for RD mill 10.

Figure 7:
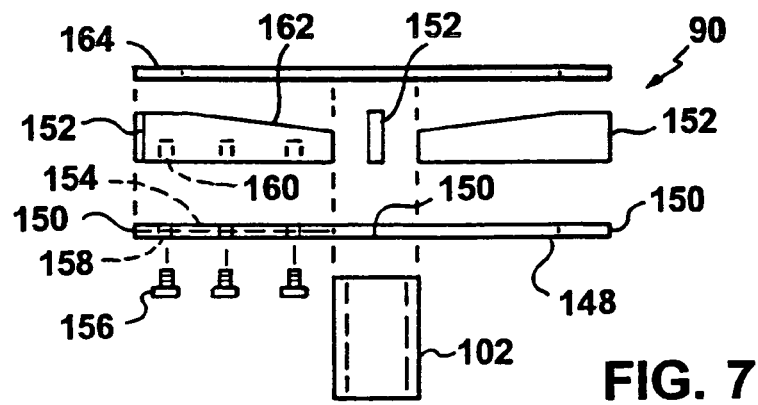
FIG. 7 is an expanded view of the distributor rotor.

Referring now also to FIG. 7, the topmost rotor 90, which will also be referred to as a distributor rotor, is positioned closest to where material is fed into housing 12 via feed chute 78. Distributor rotor 90 includes a distributor rotor plate 148 having a regular pentagonal-shaped peripheral edge fonning five apices, or outside corners 150. Five distributor rotor vanes 152 extend upwards toward top plate 44 from the top side of distributor rotor plate 148 (only three vanes are shown in FIG. 7 for clarity). Each distributor rotor vane 152 also extends approximately radially inward from an outside corner 150 to hub 102. Vanes 152 can be fixed to distributor rotor plate 148 and hub 102 by welding. Alternatively, each distributor rotor vane 152 can fit into a corresponding slot 154 formed in distributor rotor plate 90, and secured by threaded fasteners 156, e.g., bolts, that extend through apertures 158 in distributor rotor plate 90 and screw into corresponding threaded holes 160 in distributor rotor vane 152. An upper edge 162 of each distributor rotor vane 152 is sloped upwards from an elevation of about 1 inch (2.5 cm) at 102 to an elevation of about 1.5 inches (3.8 cm) near the periphery of plate 148. A pentagon-shaped distributor ring 164, which is about 1.5 inches (3.8 cm) wide, is welded to the upper edges 162 of distributor rotor vanes 152.

In the described embodiment, each of distributor rotor plate 148, distributor ring 164, and distributor rotor vanes 152 are fabricated from 0.5 inch (1.27 cm) low-carbon steel plate. In other embodiments, such parts and the housing can be fabricated of stainless steel or other suitable materials. Distributor rotor is circumscribed by a 17 inch (43.2 cm) diameter circle and is approximately 2.7 inches (6.9 cm) high. Distributor ring 164 is located approximately 1.625 inches (4.13 cm) below top plate 44 and approximately 0.25 inches (0.63 cm) below a discharge opening 166 of feed chute 78. Discharge opening 166 of feed chute 78 is positioned such that when a center of a chord of distributor ring 164 is aligned with discharge opening 166, a radially innermost edge 168 of discharge opening 166 extends about 0.5 inches (1.27 cm) inwardly beyond an inner edge 170 of distributor ring 164. When a corner 150 of distributor rotor 90 is aligned with feed chute 78, the outside of discharge opening 166 is completely inside distributor ring 164. This provides a large area to feed material into slots between distributor rotor vanes 152, and discharges the material from feed chute 78 onto rotor 90 as radially distant from hub 102 as possible. For reasons that will be discussed below, each vane 152 is positioned such that when rotor assembly is spinning, a trailing outer edge 172 of each distributor rotor vane 152 is shaped to be about aligned with the peripheral edge of distributor rotor plate 148 at a trailing edge of an apex 150, either without any overlap or with distributor rotor vanes 152 extending slightly over the edge of distributor rotor plate 148.

Figure 8:
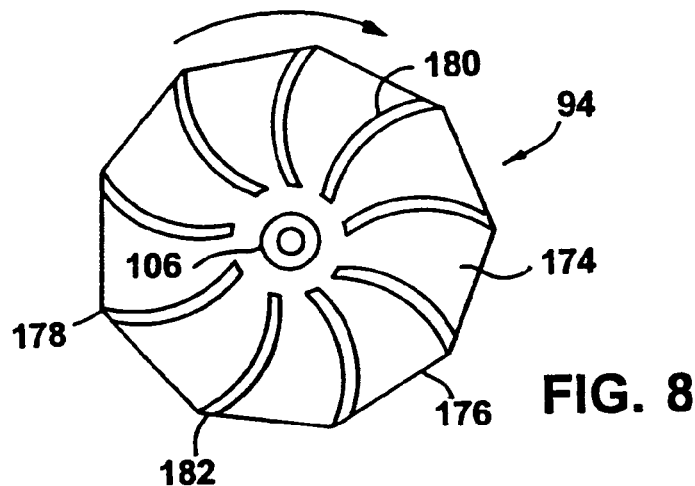
FIG. 8 is a top plan view of an orifice plate of the rotor assembly.

Other rotors 92, 94, 96, 98, 100 are designed differently from distributor rotor 90, but similarly to each other. Rotor 94 will be described as an example, with reference to FIG. 8. Rotor 94 includes a rotor plate 174 having a regular nine-sided polygonal peripheral edge 176 forming nine apical corners 178. Rotor plate 174 is welded or otherwise rigidly coupled to hub 106. Rotor 94 also includes nine curved vanes 180, each extending approximately radially inward toward hub 106 from a respective one of the apical corners 178. Vanes 180 are approximately six inches long and extend approximately one inch above rotor plate 174, which is about 0.5 inches (1.27 cm) thick. For most uses of RD mill 10, the interior curve of each of vanes 180 faces into the direction in which rotor assembly turns, although in some applications a reverse rotation provides better results. Rotor plate 174 is fabricated from 0.5 inch (1.27 cm) low-carbon steel plate, and vanes 180 are fabricated from 0.5 inch (1.27 cm) wall, 8 inch (20.3 cm) outer diameter steel tubing. Vanes 180 are set in respective 0.125 inch (0.32 cm) deep grooves (not shown) formed on an upper face of rotor plate 174, and secured in place with three threaded fasteners (not shown) that extend through apertures formed in rotor plate 174 (not shown), in a manner similar to that described above with reference to distributor rotor 90 illustrated in FIG. 7. This arrangement permits simple removal and replacement of vanes 180. Alternatively, rotors 180 may be welded to rotor plates 174, or otherwise affixed to rotor plates 174. Outer trailing edges 182 of vanes 180 are beveled at an angle to align with peripheral edge 176 of rotor plate 174 such that there is no overlap between rotor plate 174 and vane 180, or so that trailing edge 182 extends slightly over edge 176 of rotor plate 174 on the trailing side of an apical corner 178.

The other rotors, rotors 92, 96, 98 and 100, are configured similarly to rotor 94, each having a nine-sided peripheral edge 176 and curved vanes 180 extend radially inward from apical corners 178 toward respective hubs 104, 108, 110 and 112. In the embodiment illustrated in FIG. 5, rotors 92, 94, 96, 98 and 100 are circumscribed by circles having diameters of 17, 19, 21, 21, and 21 inches, respectively. Each of vanes 180 is approximately 6 inches (16.2 cm) long about its outer perimeter and shaped at its apical corner 182 so that there is little or no overlap between vane 180 and rotor plate 174 at its trailing edge 182. Each of rotors has a height of approximately 1.5 inches (3.8 cm). Because rotor 92 is smaller than the other rotors and vanes 180 are the same size on all rotors 92, 94, 96, 96, 100, each of vanes 180 on rotor 92 extend approximately to hub 104, whereas vanes 180 on rotors 94, 96, 98, 100 do not extend all the way to hubs 106, 108, 110, 112, respectively, a gap being provided therebetween.

Figure 11:
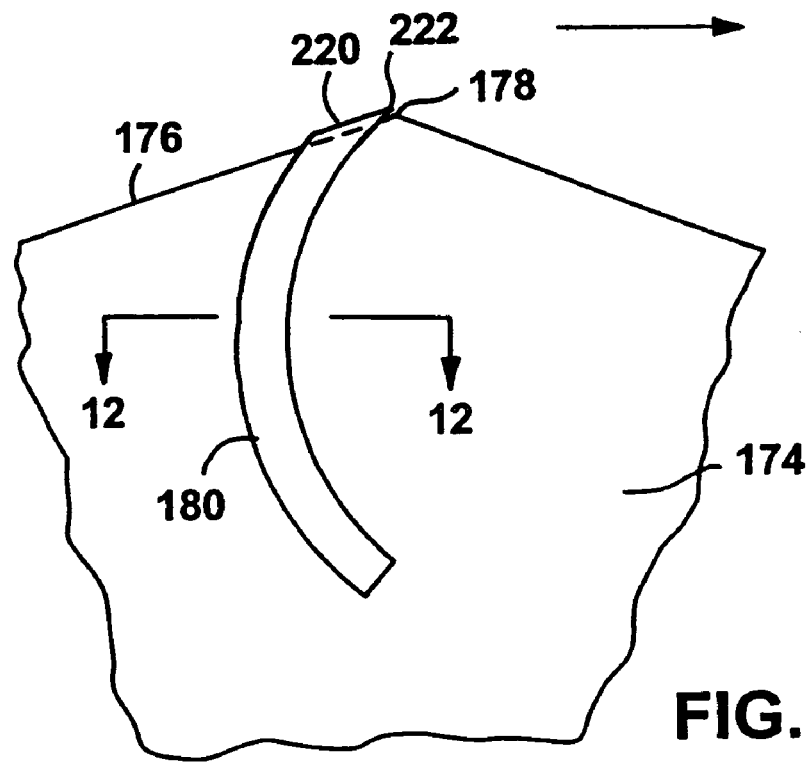
FIG. 11 is a plan view of a portion of a rotor with another embodiment of a rotor vane.

Referring now to FIG. 11, each of vanes 180 may be positioned to provide a small overhang 220 over the edge 176 of the rotor plate to which it is attached. Overhang 220 would be no more than about a thirty-second of an inch, and would enhance the Coanda flow. Note that vane 180 illustrated in FIG. 11 is also positioned such that overhang 220 is shaped similar to edge 176 of rotor plate 174, and an outer tip 222 of its leading surface 224 is positioned about over apical corner 178. The arrow in the figure indicates a direction of rotation.

Figure 12:
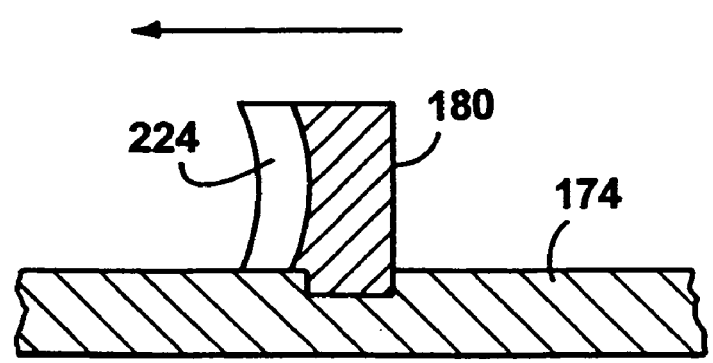
FIG. 12 is a cross sectional view through line 12—12 of FIG. 11.

Referring now to FIG. 12, vanes 180 may also be modified to have a curved profile, like a turbine blade, on its leading surface 224 with respect to a direction of rotation (arrow) to provide a more efficient pumping action.

Figure 9:
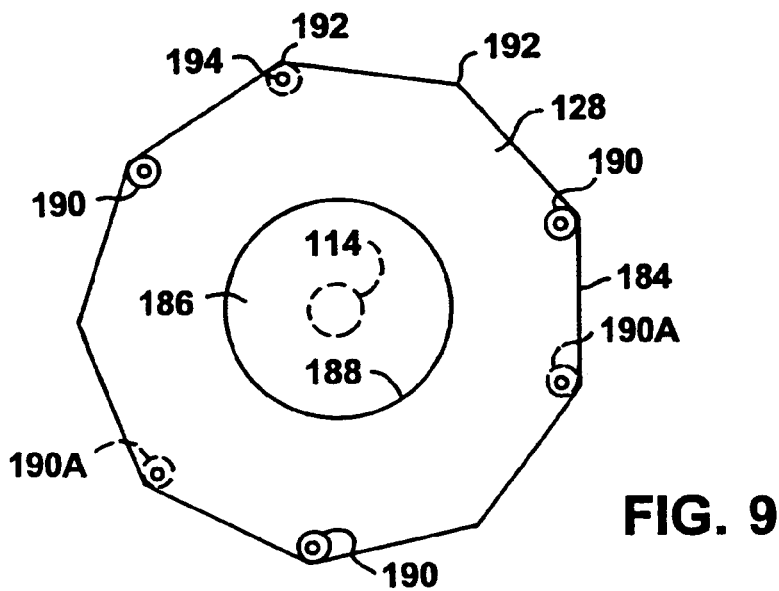
FIG. 9 is a top plan view of a rotor.

Referring now also to FIG. 9, orifice plate 128 can be fabricated from 0.5 inch (1.27 cm) low-carbon steel plate. Its peripheral edge 184 forms a nine-sided polygon sized to fit closely against sides 40 of housing 12. Orifice plate 128 includes a central aperture 186 formed by inner rim 188, which, with spacer 114, provides annular-shaped orifice 138 therebetween. Orifice plates 130, 132, 134, and 136 are similarly configured. Orifice plates 128, 130, 132, 134, and 136 have apertures 186 with diameters of 7, 8, 9, 10 and 11 inches (17.8, 20.3, 22.9, 25.4, and 27.8 cm), respectively.

Figure 10A:
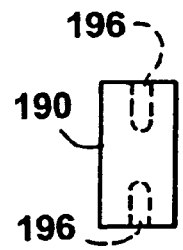
FIGS. 10A and 10B are elevation and plan views, respectively, of a rotor assembly support pin.
Figure 10B:
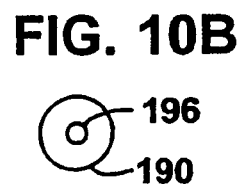
Figure 6:
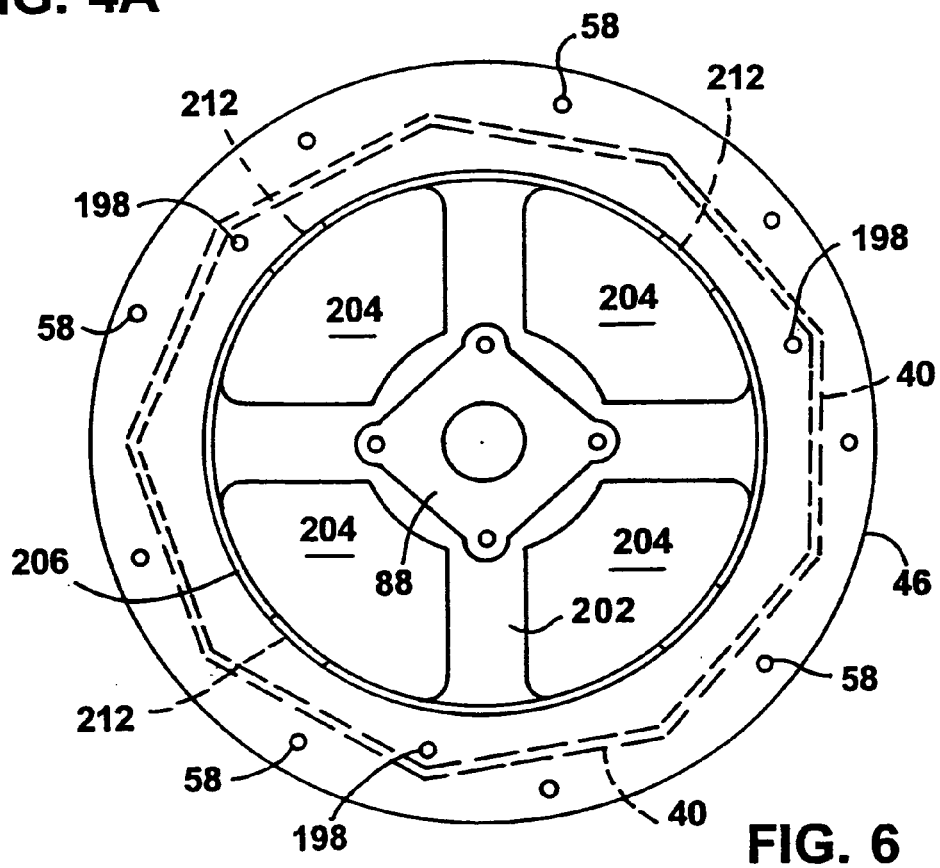
FIG. 6 is a bottom plan view of the rotor assembly housing.
Figure 5:
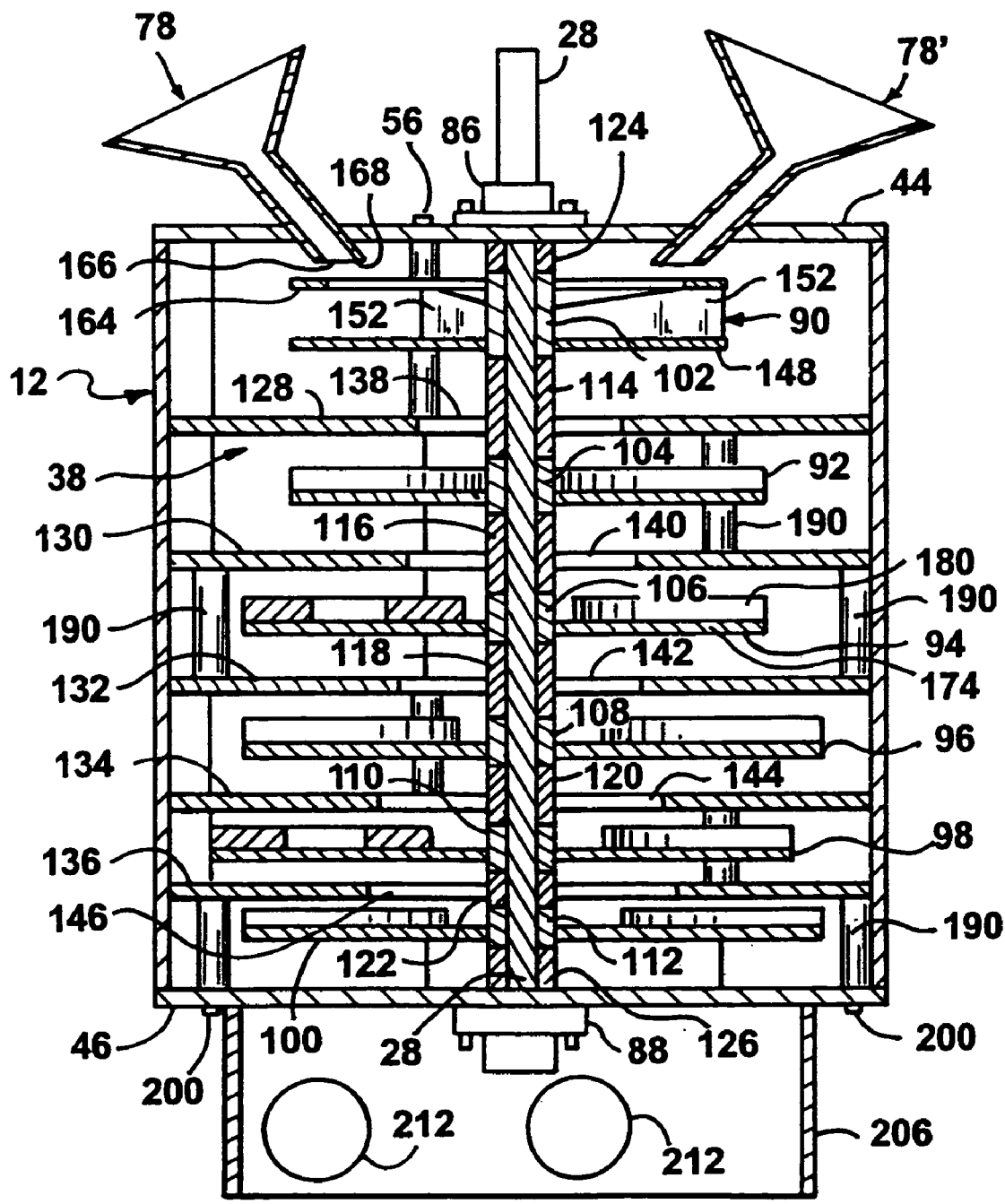
FIG. 5 is a cross sectional view through line 5—5 of FIG. 4, showing the rotor assembly within the rotor assembly housing, with a second feed chute included.

Referring back to FIGS. 4 and 5, and also to FIGS. 10A and 10B, orifice plates 128, 130, 132, 134, 136 are supported independently of panels 60, 62, 64 by support pins 190. Support pins 190 can be fabricated from 2 inch (5.1 cm) diameter steel rod. Three equally spaced apart pins 190 are positioned between each neighboring pair of the orifice plates. Each support pin 190 is located at an apical corner 192 of an orifice plate so that it is adjacent an interior corner 42 of housing. As shown in FIGS. 5 and 9, support pins 190 on one side of an orifice plate, e.g. orifice plate 128, are offset by one apex (40°) from support pins 190A on the other side of that orifice plate.

Support pins 190 are attached to the orifice plates by threaded fasteners 194, e.g., bolts, that extend into countersunk through holes (not shown) formed in the orifice plates and into threaded holes 196 formed in pins 190. Three support pins 190 that are attached to an upper side of orifice plate 128 can also be attached to top plate 44 with threaded fasteners. For example, bolts 56, which are also employed to hold straps 52 as described above with reference to FIG. 2, can be employed to fasten to these three pins 190. Three support pins 190 that are attached to a bottom side of orifice plate 136 can also be attached to bottom plate 46. Bottom plate 46 includes three apertures 198 through which threaded fasteners 200 (shown in FIG. 5) can be inserted for fastening to these three pins 190.

Referring again to FIG. 6, bottom plate 46 includes a web 202 forming four apertures 204 through which pulverized material is discharged from housing 12. A 23 inch (58.4 cm) diameter skirt 206 depends from bottom plate 46 just outside of apertures 204. Web 202 supports rotor assembly 38 from bottom bearing assembly 88, which is bolted to web 202. The size of web 202 is made as small as possible to maximize the size of apertures 204 within skirt 206.

The diameter of skirt 206 is sized to fit into a 55 gallon open barrel 208, which rests on rollers 209. A fabric belt 210 is employed between skirt 206 and barrel 208 to inhibit fine pulverized particles from escaping. Skirt 206 includes four apertures 212 (only two shown in FIG. 3). Each aperture 212 includes a bolt circle employed for attaching a respective 6 inch (15.2 cm) diameter tube 214 (only two shown in FIGS. 1 and 2). Tubes 214 extend approximately radially outward from skirt 206, and each tube 214 has a fabric filter bag 216 removably attached to it. Air is exhausted from RD mill 10 through tubes 214. Filter bags 216 catch fine particles and allow air to pass through.

In the described embodiment, rotors 90, 92, 94, 96, 98, 100 and orifice plates 128, 130, 132, 134, 136 are positioned as follows. The top surfaces of orifice plates 128, 130, 132, 134, and 136 are respectively located approximately 2.875, 2.125, 1.875, 1.625, and 1.375 inches (7.3, 5.4, 4.8, 4.1 and 3.5 cm) below the bottom surfaces of respective rotors 90, 92, 94, 96, and 98. Orifice plates 128 and 130 are approximately 5 inches (12.7 cm) apart; orifice plate 130 and 132 are approximately 4.5 inches (11.4 cm) apart; orifice plates 132 and 134 are approximately 4 inches (10.2 cm) apart; and orifice plates 134 and 136 are approximately 3.5 inches (8.9 cm) apart. The tops of vanes 180 on rotors 92, 94, 96, 98 and 100 are about 1.375, 1.187, 0.875, 0.625, and 0.5 inches (3.5, 3.0, 2.2, 1.6 and 1.3 cm) below respective orifice plates 128, 130, 132, 134, and 136. Rotor 100 is positioned approximately 1.75 inches (4.4 cm) above bottom plate 46. Rotors 92, 94, 96, 98 and 100 are rotated relative to their next nearest rotor by about 7.2 degrees.

It can be seen that rotors 90, 92, 94, 96, 98, 100 of rotor assembly 38 have sizes that generally increase with increasing distance from a top end of housing 12 through which material to be pulverized or otherwise processed is introduced into housing 12. The smallest rotors 90, 92 are located closest to top plate 44, the largest rotors 96, 98, 100 are positioned closest to bottom plate 46, and an intermediate sized rotor 94 is positioned about midway between top plate 44 and bottom plate 46. This arrangement is particularly adapted for disintegrating large size objects. If the feed material comprises smaller sized particles, such as pyrolytic carbon char, the rotors could be of a more uniform, larger size. In some applications, it may be advantageous to have rotors that are all the same size, or to alternate between larger and smaller rotors in some fashion.

In addition, orifices 138, 140, 142, 144, 146 are of generally increasing size with increasing distance from the top end. This arrangement is used to maintain a negative back pressure at each stage. For other applications, this arrangement could be reversed, the orifices could be a more uniform size, or the orifice sizes could be varied in a different manner from one end of housing 12 to the other.

The spacing between each orifice plate and the rotor next below it generally decreases with increasing distance from top to bottom. Moreover, the rotors and orifice plates are positioned such that the spacing between adjacent orifice plates generally decreases from top to bottom. This decreases the volume in stages between the top and bottom of rotor assembly 38.

Material flowing through an orifice in RD mill 10 first undergoes a velocity increase and an accompanying decrease in pressure. Then, because the available volume decreases at each succeeding stage, the material flowing through RD mill 10 experiences a rapid compression, which in turn can cause a rapid increase in pressure and/or temperature. The size of the orifice is increased with each succeeding stage to provide a pressure immediately downstream of an orifice that is lower than the pressure immediately upstream the orifice. This negative back pressure that is maintained across each orifice helps to maintain the flow.

As best understood, material introduced into RD mill with rotor assembly spinning at speeds of approximately 1000 revolutions per minute (rpm) or greater are disintegrated primarily by pressure changes, including shock waves, generated within housing 12. Observations indicate that material fed into feed chute 78, as well as air entering through feed chute 78, is accelerated rapidly and is then entrained into a fluid-like flow through the spinning rotor assembly 38. It appears that the material in the flow is almost immediately subjected to a rapid-fire succession of shock waves, the first of which may begin to break up the feed-stock material even before it reaches the distributor rotor.

The spinning rotors 90, 92, 94, 96, 98, 100 create a very strong air flow through housing 12. It appears that material fed into RD mill 10 through feed chute 78 is entrained in this flow. (In fact, the air flow actually increases for a given rotor speed when a solid particulate material is being processed.) The material apparently flows, with the air or gas flow, through RD mill 10 making minimal contact with sides 40 of housing 12 or with orifice plates 128, 130, 132, 134, 136. This is due to the flow being influenced by the Coanda effect to closely follow the contours of the rotor periphery 174 and orifice rims 188. For this reason, the flow through RD mill of material and air is called a "Coanda flow." The Coanda effect helps to reduce high-angle contacts between the flowing material and the component due to the piezoelectric properties of the materials, as they experience rapid compression or decompression. Some places where large accelerations may take place include at discharge opening 166 of feed chute 78, going around vanes 152, 180, going around distributor rotor plate 148 and around rotor plate peripheral edges 176, and going around rims 188 of orifices 138, 140, 142, 144, 146. Large pressure changes may take place when the flow passes through an orifice or when the flow is pumped by a rotor.

A non-uniform electromagnetic field may also be generated within housing 12 as rotor assembly 38 rotates. Rotors 90, 92, 94, 96, 98, 100, as well as housing 12 and orifice plates 128, 130, 132, 134, 136, are all made of low-carbon steel, which is ferromagnetic. The spinning rotors would create a rapidly changing, non-uniform electromagnetic field. These electromagnetic fields could enhance piezoelectric effects in the material in the Coanda flow.

Primary pulsed standing shock waves may also be produced as vanes 152, 180 on rotors 90, 92, 94, 96, 98, 100 alternately pass sides 40 and corners 42 of housing. Decompression would occur as the rotors pass each empty interior corner 42 of housing 12, and compression would occur as the vanes pass the center of each side 40. A shock wave of this type would be created every 40 degrees of rotation of a vane.

Moreover, secondary pulsed standing shock waves may be produced as vanes 152, 180 pass by support pins 190, three of which are located proximate each rotor. Vanes 180 of the largest rotors, rotors 96, 98, 100, pass within about 0.1 inches of support pins 190. These shock waves would be produced every 120 degrees of rotation of a vane on a rotor due to compression of the flow as the vane passes each of the three support pins located near the rotor. Twenty-seven shock waves are generated for each rotation of a nonagon-shaped rotor. Thus, support pins 190 are employed to support the orifice plates and also to help generate shock waves. While in the described embodiment cylindrical support pins are employed for these purposes, a different arrangement can be used to support the orifice plates, and differently shaped members can be positioned in corners 42 opposite respective rotor vanes 150, 180 for generating the secondary shock waves.

Before material is fed into RD mill, rotor assembly 38 is brought up to an operating speed of rotation. The spinning rotors generate a large air flow with negative back pressure through feed tube 78 and down through RD mill 10. Thus, any material fed into feed tube 78 will be immediately drawn in and accelerated rapidly towards distributor rotor 90.

As noted above, material may be broken apart while accelerating down feed chute 78, or while changing direction when exiting discharge opening 166. It is believed that discharge opening 166 acts as an orifice through which air and the feed-stock material flows into the larger-volume region between top plate 44 and distributor rotor 90. The flow through this first orifice provided by discharge opening 166 can cause a pressure change, which may be accompanied by a temperature change. The pressure change, along with the rapid acceleration of the particles exiting feed tube 78, can cause a first shock compression and/or expansion and an initial breaking apart of some particles.

Small particles, less than about 1–1.5 inches (2.5–3.8 cm) in size, are quickly entrained in the Coanda flow and flow through distributor rotor 90 between distributor rotor plate 148 and distributor ring 164. Distributor rotor 90 has five apical corners, rather than nine, to create longer wavelength shock waves, which has been found to be effective for breaking up larger particles. For this reason, in other embodiments that may be used for breaking up very hard materials, rotors 92, 94, 96, 98 and 100 may be configured with a generally increasing number of sides with increasing distance from a top end of housing 12 through which material is introduced. For example, distributor rotor 90 and rotor 92 could be configured as pentagons, rotors 94 and 96 as heptagons, and rotors 98 and 100 as nonagons.

When the Coanda flow passes through orifice 138, the particles experience a rapid directional change and an increase in velocity with a corresponding pressure rise. The flow is immediately compressed because the volume between orifice plate 128 and rotor 92 is smaller than the volume between rotor 90 and orifice plate 128. This can also cause a rapid increase in pressure and an accompanying temperature increase. At this stage, there would still be some high-velocity impacts of larger particles against sides 40 and against pins 190, the larger particles bouncing off these structures or breaking up and then colliding with particles in the Coanda flow.

This process of rapid acceleration, expansion, and compression is repeated as the flow passes through each succeeding stage and rounds the rotors and orifices. These rapid variations in pressure and acceleration of the flowing material may contribute to creating shock waves which pulverize material flowing through RD mill 10. In addition, the rapid compressing and decompressing of material in the flow can cause a build-up of piezoelectric energy and subsequent releases in the material, which may cause the break-up of some material into smaller sized particles. It is believed that the primary and secondary pulsed shock wave fronts are reinforced by shock waves created by piezoelectric energy releases in the flow. The rapid flow of material through the non-uniform electric and magnetic fields within RD mill 10, which are generated by the spinning rotors, may also contribute to piezoelectric compression and decompression of material in the flow, thus also contributing to generating shock waves in the flowing material.

RD mill 10 can heat material being pulverized such that virtually all free moisture is driven off Product comes out of RD mill 10 warmed to approximately 40–100 degrees Celsius or higher. Electric discharges from the material and the rapid expansion then compression after the flow passes through each orifice may increase the temperature of the flowing material and drive moisture out. It appears that volatile organic materials are also vaporized out of the flowing material or otherwise transformed. The piezoelectric energy releases and frictional heating of particles in the flow likely contribute to the observed general increase in temperature of the pulverized material. However, flowing only air or another gas, such as carbon dioxide, through RD mill 10 caused housing 12 to warm substantially. Therefore, some of the heating effect is also probably due to pressure changes in the flowing material and energy dissipated from shock waves.

In alternative embodiments, a gas other than air can be used for flowing the material being processed through RD mill 10. For example, a non-reactive gas may be used instead of air, or a more reactive gas may be used. In other embodiments, a less reactive gas or a more reactive gas may be added to the airflow. Also, a cooling fluid, such as liquid or gaseous cold nitrogen can be added to the flowing gas to moderate the temperature of material being processed.

In the following examples certain procedures were carried out in processing material in RD mill 10. First, RD mill 10 was brought up to a desired steady state operating speed of rotation. Then, the material to be processed was continuously fed into the feed chute with the RD mill 10 maintaining a steady state operational speed of rotation. If desired, the rotation speed was adjusted. For many materials, a small change in the rotation speed would significantly change in the power consumption of RD mill 10. In fact, power consumption sometimes went down for an increase in rotational speed, indicating resonant operation Typically, only material processed during steady state operating conditions was characterized. Material processed at the beginning and end of a run were usually not considered indicative of optimum operation. Processed material can be passed through RD mill 10 multiple times if desired.

Ultra-Fine Carbon Particles

An example of a useful material that can be micronized by RD mill 10 is carbon. RD mill 10 can produce ultra-fine carbon particles from different carbon sources. Some of the starting materials that we have tested are pelleted standard reference carbon black N660, from Ballentine Enterprises Inc. of Borger, Tex., and dry carbon char having low volatiles produced by pyrolysis. With both materials, RD mill 10 produced a finer size micronized carbon material.

Granules of pyrolytic dry char having low volatiles were processed by Pulsewave, Inc. of Englewood, Colo. in a RD mill 10 produced by C. A Arnold & Associates, Inc., also of Englewood Colo. The carbon char was provided by Carbon Products International of Abington, Md. Carbon char will typically have about 7–8% oxygen content by weight, and also small amounts of other impurities, notably silica. RD mill 10 can process about one ton of such carbon per hour.

Figure 13B:
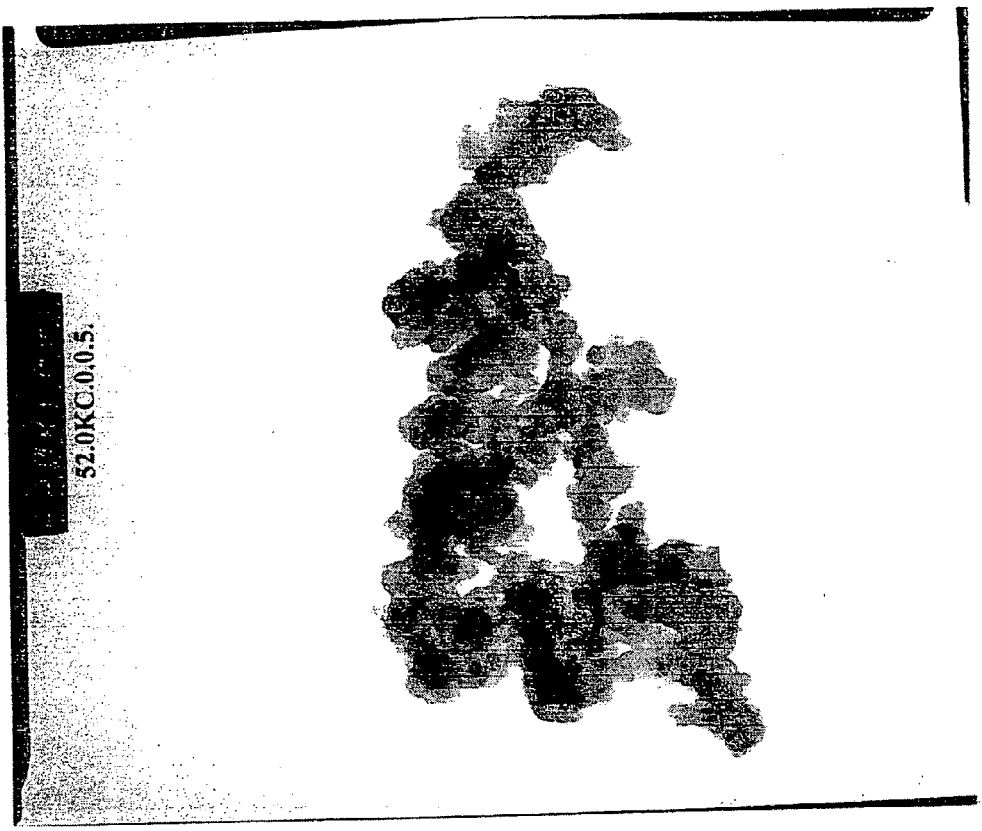
FIGS. 13A and 13B are micrographs of carbon black particles produced by resonance disintegration of carbon char granules.
Figure 13A:
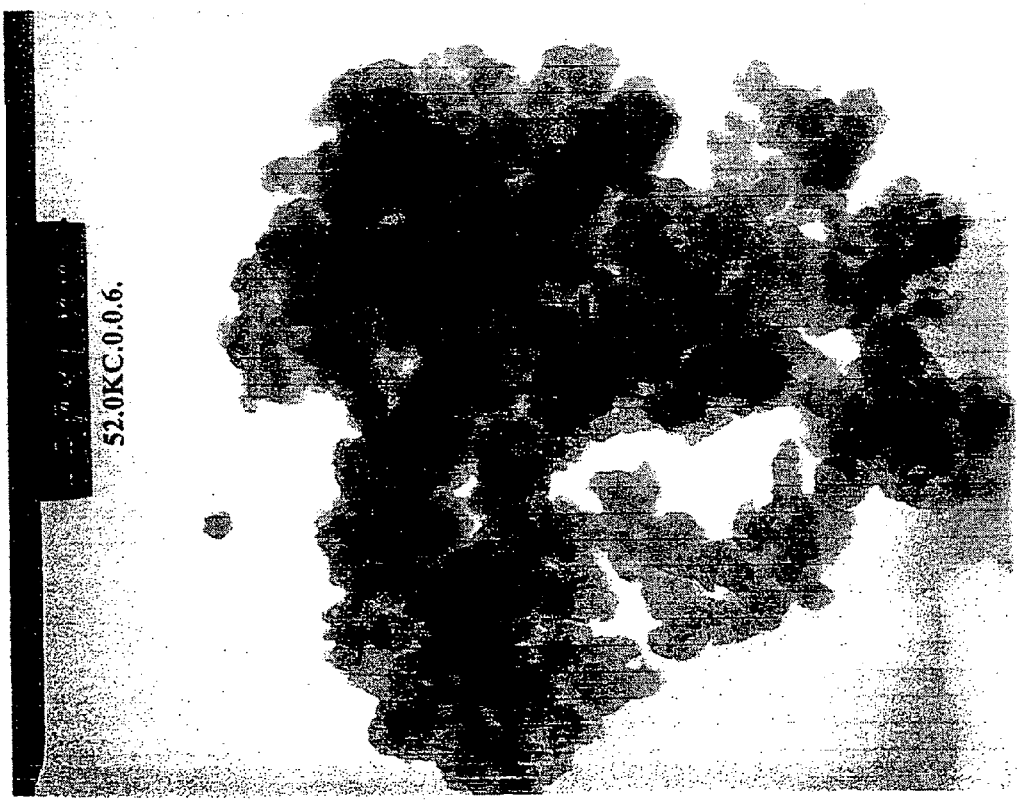

The char can be processed at rotation speeds of about 3200–5700 rpm to produce a form of carbon black. Passing the granules through RD mill 10 operating at 3600 rpm one to two times was sufficient to convert the granules into a flowable powder of carbon black. When viewed under a light microscope the carbon black is seen appear as spherical particles mostly in the range of 0.5–1.5 micrometers. While appearing roughly spherical under a light microscope, they are in fact irregular in shape. When observed using an electron microscope (FIGS. 13A and 13B), the individual particles appear to be aggregates that include a variable number of about 100 or more aggregated or linked "primary" particles. The aggregates are rather similar in appearance to carbon black particles produced from controlled low-oxygen burning of organic gases and petroleum products. The overall appearance of the aggregates of adhered primary particles is somewhat like grape clusters. Most of the primary particles are quite uniform in size, ranging in size from about 10–30 nanometers. It is clear that the adhering primary particles consist of many atoms of carbon. It is possible that the primary particles can be released from the aggregated larger cluster particles by stronger resonance forces than applied in this example.

Carbon char was also processed using RD mill 10 operating at a speed of 4500 rpm. The resultant carbon powder was recycled through the RD mill 10 two additional times. The size distribution of this material as determined by direct microscopic measurement of hundreds of particles dispersed in water or isopropyl alcohol was mostly in the range of about 0.3–10 micrometers, with over half the particles below about one micrometer. Dispersion was best in water. As with the above example of carbon char processed at 3600 rpm, electron microscopy resolved the individual particles, as viewed by light microscopy, to be aggregates of generally spherical primary particle units assembled to form an irregular crystalline complex.

Similarly, about 50 kg of dry, pelleted standard reference carbon black N660, from Balentine Enterprises, Inc. of Borger, Tex., was processed by RD mill 10 operating at 4500 rpm_Carbon black is typically a higher purity form of carbon than is char.

To characterize the product of RD mill 10, particle size distributions were determined, in part, using laser diffraction. This was carried out by Materials Analysis Laboratory of Micrometrics Instrument Co., of Norcross, Ga. 2% by weight carbon samples were prepared in both isopropanol and deionized water containing 0.1% LOMAR® P-62 and were briefly ultrasonically treated. Scanning tunneling microscopy (STM) was performed at room temperature on compressed, sliced samples of carbon powder using a Nanoscope ILIA instrument with a 2082A probe head. All STM work was done at Laboratoire de Chimie Physique, ENSCMu, Mulhouse, France. Nitrogen surface area (NSA), multipoint (NSA) and statistical thickness surface area (STSA) were measured by the Materials Analysis Laboratory of Micrometrics Instrument Co. The n-dibutyl phthalate absorption number (DBPA) and the n-dibutyl phthalate absorption number, compressed sample (CDBPA) were measured by Titan Specialties, Pampa, Tex.

The analytic results characterizing the carbon black and the pyrolytic char before undergoing resonance disintegration, after being processed once by RD mill 10, and after twice being processed by RD mill 10 are summarized in Tables 1 and 2, respectively. FIGS. 14 and 15 show the volume frequency vs. diameter for the carbon black samples dispersed in water and in isopropanol, respectively, and FIGS. 16 and 17 show the volume frequency vs. diameter for the pyrolytic char samples dispersed in water and in isopropanol, respectively.

For the standard reference carbon black N660 dispersed in water, resonance disintegration produced a significant decrease in the size of agglomerates. Prior to RD processing, approximately 60% of the material had a particle size distribution that was centered at 4.2 m. After RD processing this peak is gone and about 90% of the carbon black was below 1 m in particle diameter.

However, the carbon black samples dispersed in isopropanol exhibited different results. After RD processing, there was an increase in agglomerates. From what was essentially a single peak as 2.0 m with only 1.1% above 5 m, RD processing produced a trimodal distribution of particle sizes with 28% of the material above 5 m.

second RD processing of the once processed material reduced the amount of material below 5 m by over 32% and extended the range of the largest particles from 28 to 71 m.

The RD processed char was also examined using an atomic force microscope. There were particles that clearly could be characterized as aggregates. However, about 90% of the free particles (non-aggregated particles) were below about 1 micron in size.

Table 3 shows measurements of various physical properties of pyrolytic char that has been RD processed The physical properties of char did not vary significantly (<10%) if the char was processed once or twice by resonance disintegration. The nitrogen surface area rose from 58 m2/g to 66 m2/g (+14%) as char was processed.

TABLE 1

Resonance Disintegration of Standard Reference Carbon Black N660

| | Dispersion Solvent | Particle Diameter Range (m) | Significant Peaks (m) | Median Volume Distribution (m) | % Volume <1 m | % Volume >5 μm |
|---|---|---|---|---|---|---|
| Before RD | Water | 0.18–11 | 0.42, 4.2 | 3.0 | 27 | 21 |
| | Isopropanol | 0.28–22 | 0.47, 2.0 | 1.8 | 12 | 1.1 |
| After RD | Water | 0.19–3.3 | 0.47 | 0.52 | 90 | 0 |
| | Isopropanol | 0.25–84 | 0.53, 2.5, 20 | 2.7 | 12 | 28 |

TABLE 2

Resonance Disintegration of Pyrolytic Carbon Char

| | Dispersion Solvent | Particle Diameter Range (m) | Significant Peaks (m) | Median Volume Distribution (m) | % Volume <1 m | % Volume >5 m | % Volume >30 m |
|---|---|---|---|---|---|---|---|
| Before RD | Water | 0.42–530 | 75, 236 | 61 | 1.7 | 95 | 74 |
| | Isopropanol | 0.53–376 | 1.5, 35 | 17 | 5.0 | 67 | 37 |
| After RD | Water | 0.10–28 | 0.33, 1.28, 5.6 | 0.88 | 51 | 25 | 0 |
| | Isopropanol | 0.45–28 | 0.67, 1.5, 9.4 | 1.6 | 16 | 10 | 0 |
| After RD Twice | Water | 0.10–28 | 0.42, 5.6 | 0.52 | 46 | 25 | 0 |
| | Isopropanol | 036–71 | 2.1, 10.5 | 2.7 | 5.3 | 39 | 7 |

The size of pyrolytic char particles dispersed in water was significantly reduced after resonance disintegration. Three fourths of the volume of unprocessed char was above 30 m and less than 2% of the volume was submicron in particle size. RD processing eliminated essentially all particles above 30 m and increased the submicron size volume fraction to about one half the material. A second RD processing did not significantly change the particle size distribution.

For char particles dispersed in isopropanol, a first RD processing reduced the largest particle size from over 350 m to under 30 m. It increased the volume of material from 0.4 to 5 m, at the expense of 82% of the material over 5 m. A

TABLE 3

Physical Properties of Resonance Disintegrated Pyrolytic Carbon Char

| Nitrogen Surface Area, Midpoint | Statistical Thickness Surface Area | n-Dibutyl Phthalate Absorption Number | n-dibutyl Phthalate Absorption Number, Compressed Sample |
|---|---|---|---|
| 66 m²/g | 50 m²/g | 79 ml/100 g | 72 ml/100 g |

Resonance disintegration causes a significant size reduction in standard carbon black N660 and in pyrolytic carbon char as observed when the materials are dispersed in water De-agglomeration is particularly marked with the carbon black N660, where the submicron particle diameter population rises from 27% to about 90% of the volume after RD processing. Pyrolytic char granules are broken down and approximately 50% of the resulting carbon material is distributed in particle sizes of less than one micron. The remaining carbon, all less than 30 m in size, is presumed to be composed of agglomerates that either are not decomposed by RD, even on further processing, or that form in equilibrium with more disagglomerated carbon particles under the conditions of dispersion.

Dispersions of the same RD processed carbon powders in isopropanol exhibit particle size distributions and size trends very different from the behavior of those powders in water. Regardless of whether the RD processed carbon particles originally were in the form of pyrolytic char or carbon black, the submicron fraction remains insignificant. As shown in FIGS. 14 and 16, most of the RD processed carbon is in a 1–3 m range when dispersed in isopropanol. In addition, there is an increase in what are presumed to be aggolomerates above 5 $\mu$m on a single RD processing of the carbon black and on successive RD processing of char.

A possible explanation lies in the different chemistries of the two solvents. Water is more of a proton donor than acceptor. Isopropanol is both a strong proton donor and acceptor, and provides hydrophobic regions. Based on the greater tendency of the RD processed carbon to disperse in water over isopropanol, this indicates that RD processing makes the carbon surfaces more hydrophilic.

We measured the surface chemistry of the carbon, both before and after RD processing, with x-ray photoelectron spectroscopy. In the unprocessed carbon char, the total weight percentage of oxygen is about 7–8%. This is unchanged by RD processing. However, x-ray photoelectron spectroscopic analysis showed that the positioning of oxygen to the surface was increased by RD processing. Apparently, oxygen that was bound within the unprocessed pyrolytic char migrated to the surface of the processed material. The oxygen is hydrophilic, and therefore it is consistent with processed carbon particles being more readily dispersed in water than in isopropanol. Moreover, the additional surface oxygen reduces the number of sites that normally would be available to the isopropanol, thereby reducing the dispersion of the processed material in that solvent. This is all consistent with the data. [00104] There are impurities other than oxygen in the char produced from scrap tires, such as zinc, sulfur, and silica particles. The zinc and sulfur can render the char undesirable for use as a feed stock material for the manufacture of rubber or other carbon-based products because they can be reactive. Large silica particles are undesirable for uses in ink jet printers where they can clog very small passages in the printing equipment.

When processed with RD mill, the silica particles are reduced to generally sub-micron sizes that generally will not clog ink jet printing equipment. However, a small amount of some larger silica particles can remain. It is believed that further processing with RD mill 10 or other processing may eliminate these larger particles to an acceptable level so that the RD processed char can be used for ink jet printing.

X-ray photo electron spectroscopy surface analysis of RD processed char shows that the other impurities, such as zinc and sulfur, are not exhibited on the surfaces of the elemental carbon particles. This indicates that these impurities are either bound within such carbon particles or they are free stand-alone particles. The impurities are non-reactive when bound within the carbon particles. As such, RD processed char can be a suitable feed stock material for manufacturing rubber and other carbon based products.

We have observed changes in RD processed carbon when the RD mill 10 has not been thoroughly cleaned after processing other materials. In one run, the carbon black particles readily captured (adsorbed) organic compounds that were volatilized during operation of the RD mill 10. This adsorption increased the cohesive flow characteristics of the carbon black. The source of the organic molecules was found to be a small amount of residue that had remained in the machine from previous operations in which flax seeds had been processed. This residue (mostly oils) had not been removed by standard steps typically used to clean the RD mill 10. The surfaces of the carbon particles were coated to the point where they could not absorb any n-dibutyl phthalate. It is believed that the coating in this example was monomolecular. Thus, RD mill 10 can be used to create desired coatings on carbon particles by adding a small amount of the desired coating material when processing carbon particles or during reprocessing of RD-processed carbon. It is apparent that carbon black can be readily and conveniently "coated" with many, and perhaps all, molecules for which it has affinity during passage through the RD mill 10.

Crystals of Organic Molecules Containing Minerals

1. Magnesium citrate. Magnesium citrate is a water soluble mineral that can be used as a dietary supplement for humans and animals. Dry crystal granules of magnesium citrate ($C_{12}H_{10}Mg_3O_{14}$, molecular weight 451) comprised of about 16% magnesium were processed in RD mill 10. The dry crystal granules were about +40 mesh (>400 micron) in size before processing. The RD mill 10 was operated at 3200 rpm and yielded a fine, non-gritty powder. After processing, the resulting powder was suspended in ethanol and spread onto microscope slides. Individual crystals were selected for measurement against a micrometer scale. Individual crystals were mostly in the size range of about 1–4 microns. While some larger particles of about 10–20 microns were present; these were composed of aggregates of the smaller (1–4 micron) crystals.

2. Calcium citrate. Calcium citrate is also used as a dietary supplement as a source of calcium. Granular crystals of calcium citrate tetrahydrate ($C_{12}H_{10}Ca_3O_{14} \cdot 4H_2O$) having an initial size range of about +40 mesh (>400 micron) were processed by two passages through RD mill 10 at 4500 rpm. A very fine smooth powder was produced that when wetted became a slippery paste. The size of the powder crystals was mostly about 1–3 microns. The individual particles readily formed weak aggregates that could be disrupted when placed in ethanol and vigorously mixed in a blender to yield a dilute suspension. When mixed with various food stuffs (e.g., orange juice, yogurt, ice cream, puddings) the RD processed calcium citrate did not alter the smooth texture of these products.

3. Methylsulfonylmethane. Methylsulfonylmethane ($CH_3SO_2CH_3$) (MSM) is a naturally occuring sulfur containing organic compound that is used as a food supplement. MSM is also readily produced by a synthetic chemical process. The crystals of MSM are prone to adherence to one another, causing caking, and hard clumps typically form when MSM is stored. Clumps of MSM were processed in a RD mill 10 operated at 3000 rpm. This produced a fine powder that readily caked into soft clumps. The processed material had a particle size that was at least −270 mesh (<53 micron) particle size. RD processed MSM dissolved more rapidly in water at room temperature than did crystals of MSM that were milled by grinding to 40–80 mesh. In test batches one gram of processed MSM was dissolved into 100 ml of water within about 15 seconds or less, whereas with the starting material clumps were still visible after two minutes of agitation.

Non-Mineral Containing Organic Compounds

1. Creatine monohydrate. Creatine monohydrate (creatine) ($C_4H_9N_3O_2$) is abundant in muscle tissue, mostly in phosphorylated form. It serves as an energy reserve in muscle and is used as a nutritional supplement, particularly by athletes and body builders. Coarse, granular crystals of creatine having a particle size of about +60 mesh (>300 microns) were manually fed into a RD mill 10 operating at about 3000 rpm. The particle size of the RD processed creatine was determined by passage through a series of screens. 93% of the processed creatine had a particle size of −400 mesh, and thus the particles were less than about 30 microns in their greatest dimension. It would be expected that even greater homogeneity could be achieved using a longer term continuous flow feed into RD mill 10, as opposed to the manual delivery in this test. Under continuous, stable loading of RD mill 10 essentially 100% of the particles would predictably be −400 mesh size. In comparison with granular crystals of creatine, the RD mill processed creatine dissolved rapidly in water at room temperature. Saturated solutions were obtained within ten minutes compared with several hours using stock granulated crystals.

2. Ipriflavone. Ipriflavone is a water "insoluble" compound that is present in various plants, e.g. soybeans, and is also produced by chemical synthesis. It is considered effective for maintaining bone structure. 500 grams of white, translucent crystals of ipriflavone were processed by an RD mill 10 along with 20 kilograms of sodium chloride crystals used as a carrier to provide loading mass for the mill. The processed material had a particle size of about −270 mesh. The ipriflavone was recovered by flotation in water. Upon drying, the now caked ipriflavone was broken apart in a mortar and tested for speed of solution in methanol. While the starting material ipriflavone was only slightly soluble in methanol, the RD processed material dissolved about 20 times more rapidly than did the unprocessed crystals. This is consistent with increased surface area/mass in the processed material. These results predict that doses of orally administered ipriflavone, which is essentially insoluble in water, would be better assimilated by the body than the initial starting material. The ability to dissolve this material in various oils and alcohols should also be improved by fragmentation using RD.

3. Zein. Zein is a water insoluble protein used as a coating on tablets. Coarse, granular crystals of zein having a particle size of about +40 mesh (>400 microns) were processed by passing the material twice through a RD mill 10 operating at about 3200 rpm. The resulting zein powder was examined microscopically and was found to consist of fine crystals with over 90% being in a size range of about 3–20 microns, with the smallest being about 1.5 microns and the largest being about 60 microns. The processed crystals appeared as flat sheets with a thickness much smaller than the length or width. The processed powder was dissolved in 80% ethanol-water by slowly adding it to the solvent while stirring rapidly. The processed zein powder dissolved to yield a relatively clear, light yellow solution. When put into 45% ethanol-water and mixed in a blender, the blender was coated almost immediately.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to illustrate the principles of the invention and demonstrate versatility in it's practical application, thereby enabling one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A continuous flow method of reducing the mean particle size of a particulate carbon material that consists of at least 90% carbon by weight, the method comprising:
   entraining the carbon material in a gas flow through an inlet of a housing;
   subjecting the flowing carbon material to a plurality of alternating pressure increases and decreases within the housing;
   disintegrating the flowing carbon material with the pressure increases and decreases, thereby reducing the mean particle size of the carbon material; and
   discharging the disintegrated carbon material though an outlet of the housing.

2. The method of claim 1, wherein the carbon material comprises an amorphous form of carbon.

3. The method of claim 2, wherein the carbon material comprises char.

4. The method of claim 3, wherein the median volume distribution of the particles of discharged carbon material is about 1.6–2.7 microns when dispersed in isopropanol.

5. The method of claim 3, wherein the discharged carbon particles when dispersed in isopropanol are characterized by at least about 93% of the particles being below about 30 microns in size, by about 61–90% of the particles being below about 5 microns in size, and by about 5.3–16% of the particles being below about 1 micron in size.

6. The method of claim 3, wherein the median volume distribution of the discharged carbon particles is about 0.52–0.88 microns or less when dispersed in water.

7. The method of claim 3, wherein when dispersed in water, the discharged carbon particles are characterized by essentially 100% of the particles being below about 30 microns in size, by about 75% of the particles being about 5 microns in size, and by about 46–51% of the particles being below about 1 micron in size.

8. The method of claim 2, wherein the amorphous form of carbon comprises 30 carbon black.

9. The method of claim 8, wherein the median volume distribution of the discharged carbon particles is from about 0.52–2.7 microns.

10. The method of claim 8, wherein the median volume distribution of the discharged carbon particles is about 0.52 microns when dispersed in water.

11. The method of claim 8, wherein the discharged carbon particles when dispersed in water are characterized by essentially 100% of the particles being about 5 microns or less, and by about 90% of the particles being about 1 micron or less.

12. The method of claim 1, wherein the carbon comprises a crystalline form of carbon.

13. The method of claim 12, wherein the crystalline form of carbon comprises graphite.

14. The method of claim 1, further comprising coating the carbon particles with an adherent material while the particles are flowing though the housing.

15. The method of claim 14, wherein the adherent material comprises an oil.

* * * * *